US012479438B2

United States Patent
Hashimoto et al.

(10) Patent No.: US 12,479,438 B2
(45) Date of Patent: Nov. 25, 2025

(54) VEHICLE CONTROL DEVICE AND VEHICLE CONTROL SYSTEM

(71) Applicant: TOYOTA JIDOSHA KABUSHIKI KAISHA, Toyota (JP)

(72) Inventors: Ryuta Hashimoto, Tokyo-to (JP); Takahiro Seta, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 119 days.

(21) Appl. No.: 18/631,830

(22) Filed: Apr. 10, 2024

(65) Prior Publication Data
US 2025/0026353 A1  Jan. 23, 2025

(30) Foreign Application Priority Data
Jul. 18, 2023  (JP) .................................. 2023-116864

(51) Int. Cl.
*B60W 30/18*  (2012.01)
*B60W 50/14*  (2020.01)

(52) U.S. Cl.
CPC ...... *B60W 30/18163* (2013.01); *B60W 50/14* (2013.01); *B60W 2050/146* (2013.01)

(58) Field of Classification Search
CPC ....... B60W 2556/50; B60W 30/18154; B60W 30/18163; B60W 50/14
See application file for complete search history.

(56) References Cited

U.S. PATENT DOCUMENTS

| | | | |
|---|---|---|---|
| 11,008,039 B2 * | 5/2021 | Fujii | B60W 30/18163 |
| 11,801,864 B1 * | 10/2023 | Arora | G06N 3/084 |
| 2018/0113450 A1 | 4/2018 | Sherony | |
| 2018/0162396 A1 | 6/2018 | Ibuka et al. | |
| 2021/0139044 A1 | 5/2021 | Ishioka | |
| 2022/0223038 A1 | 7/2022 | Chikamori | |
| 2022/0306115 A1 * | 9/2022 | Harada | G06V 20/588 |
| 2022/0306116 A1 * | 9/2022 | Hashimoto | B60W 60/0053 |
| 2022/0306162 A1 * | 9/2022 | Kawano | B60W 60/0053 |
| 2022/0307842 A1 * | 9/2022 | Seta | G01C 21/32 |

FOREIGN PATENT DOCUMENTS

| | | |
|---|---|---|
| JP | 2018-094960 A | 6/2018 |
| JP | 2021-056616 A | 4/2021 |
| JP | 2021-151817 A | 9/2021 |

(Continued)

*Primary Examiner* — John Kwon
(74) *Attorney, Agent, or Firm* — Dinsmore & Shohl LLP

(57) ABSTRACT

A vehicle control device has a processor configured to determine whether a difficult traveling zone exists between a lane change completion location and a current location of the vehicle, to calculate a first distance between an end point of the difficult traveling zone in the traveling direction of the vehicle and the lane change completion location when the difficult traveling zone exists, to determine whether the first distance is at least a reference distance, and to decide to execute a lane change for movement of the vehicle to the target lane after the vehicle has passed through the difficult traveling zone when the first distance is at least the reference distance or to decide to execute a lane change for movement of the vehicle to the target lane before the vehicle reaches the difficult traveling zone when the first distance is less than the reference distance.

5 Claims, 6 Drawing Sheets

(56) References Cited

FOREIGN PATENT DOCUMENTS

| | | |
|---|---|---|
| JP | 2021-151818 A | 9/2021 |
| JP | 2021-151819 A | 9/2021 |
| JP | 2022-108034 A | 7/2022 |
| JP | 7123645 B2 | 8/2022 |
| WO | 2018/131290 A1 | 7/2018 |

* cited by examiner

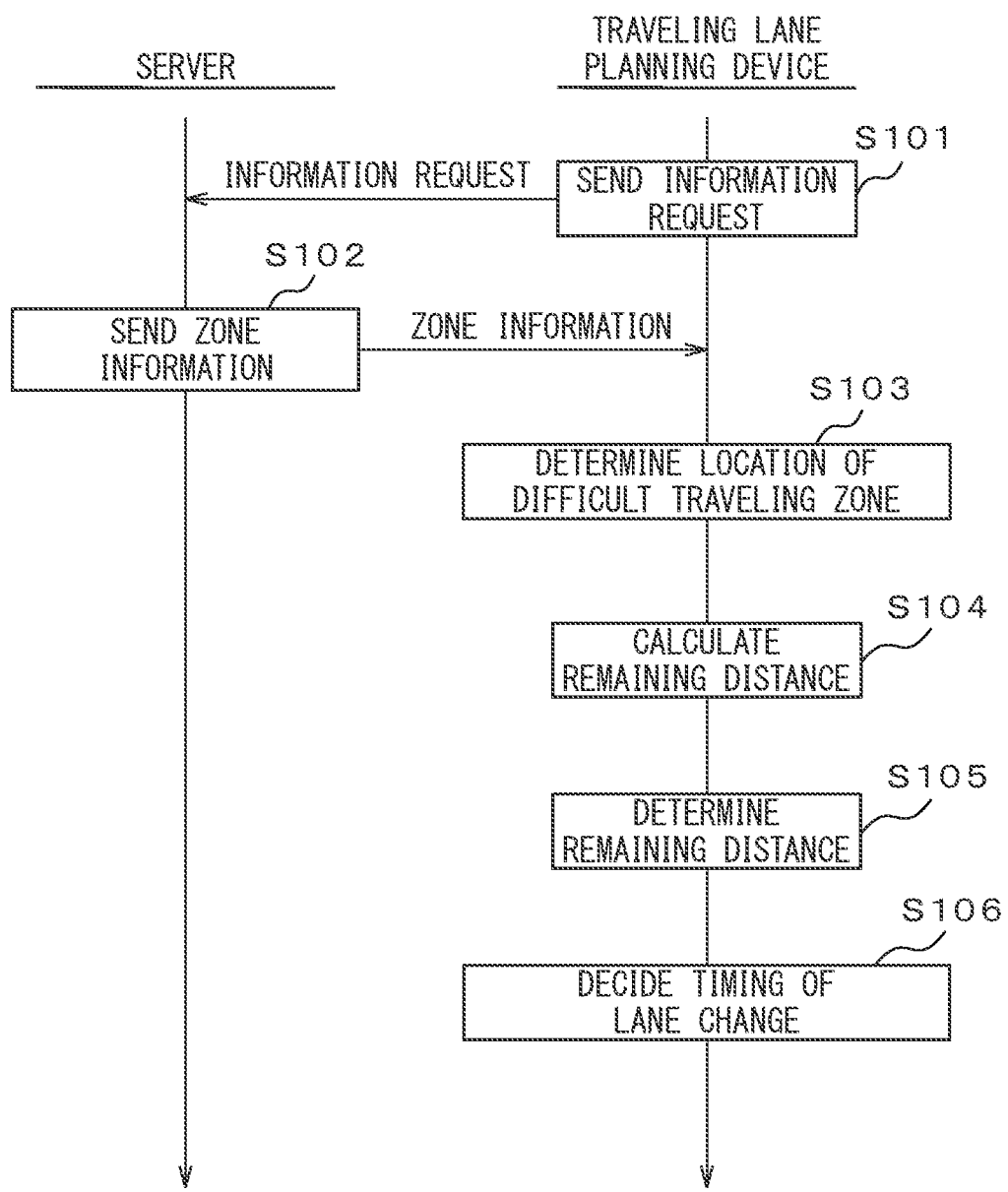

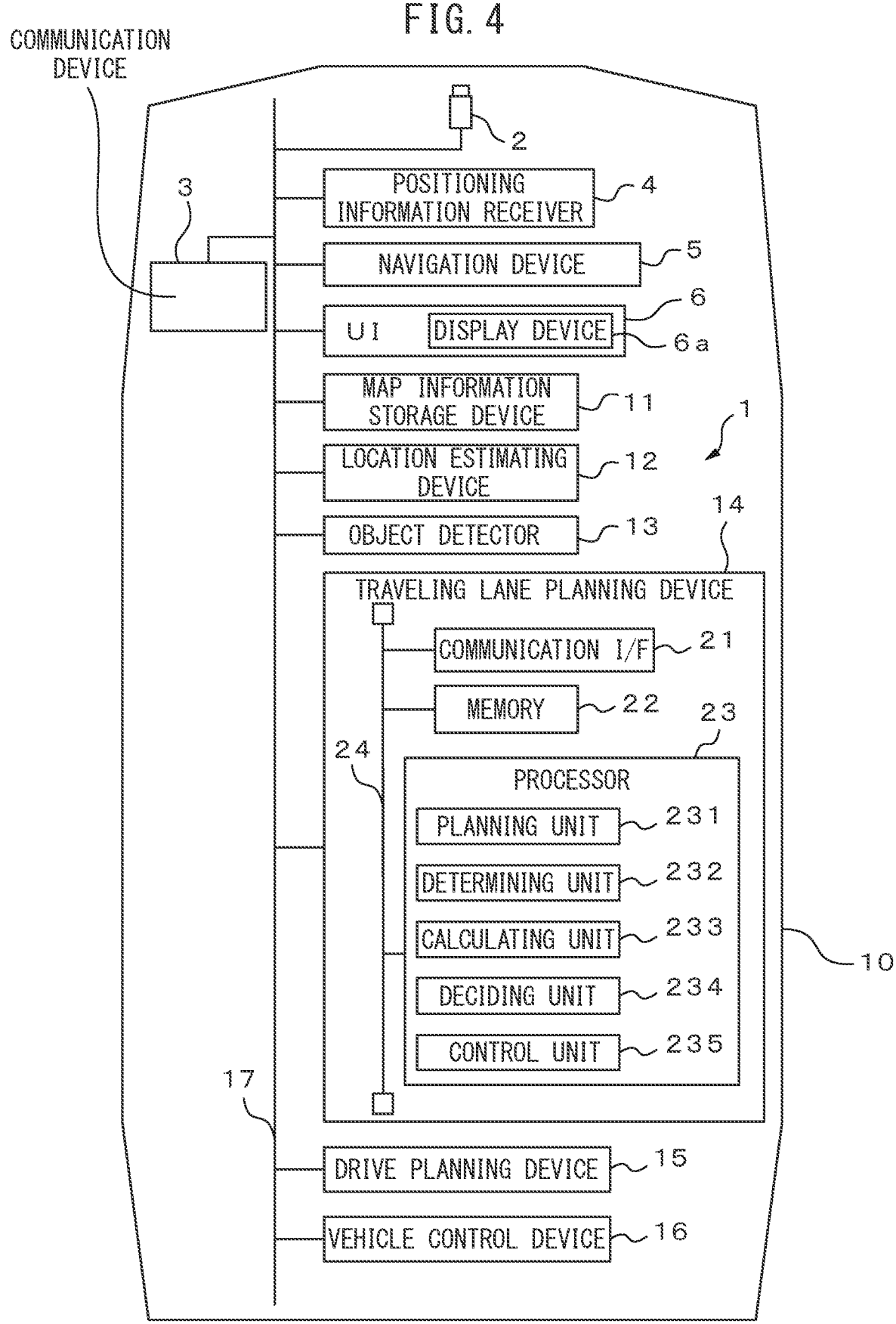

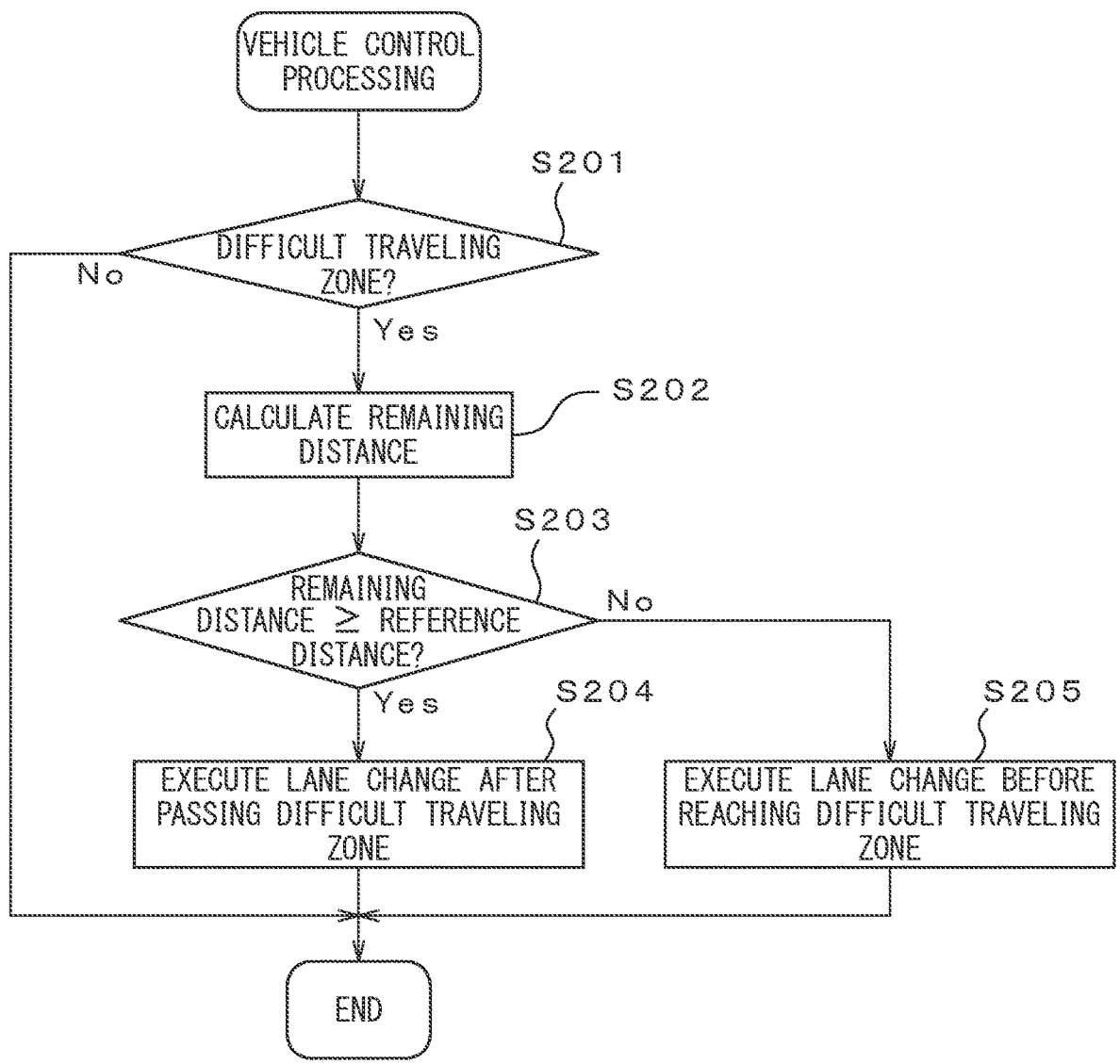

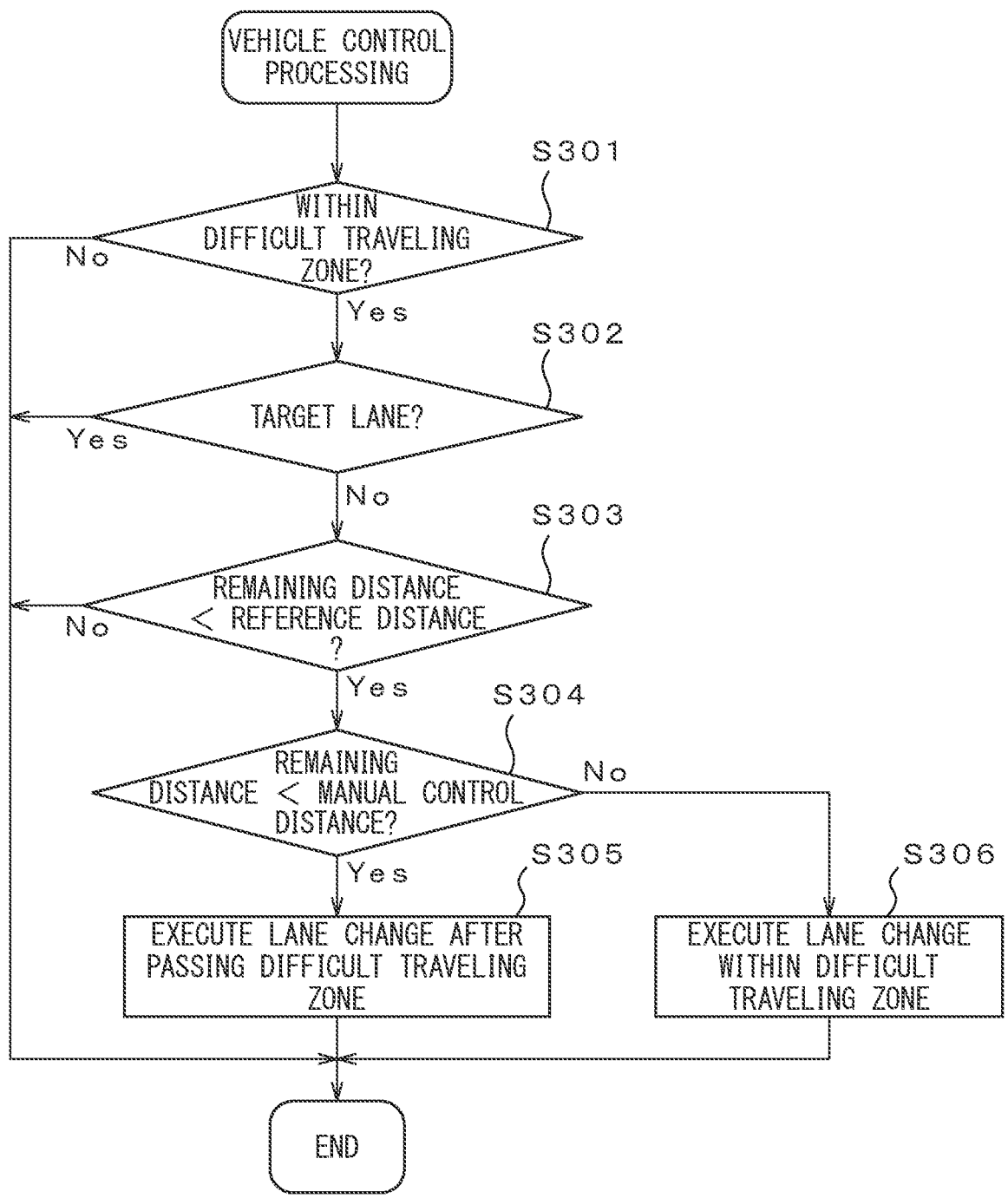

VEHICLE CONTROL DEVICE AND VEHICLE CONTROL SYSTEM

CROSS-REFERENCE TO RELATED APPLICATIONS

This application claims priority to Japanese Patent Application No. 2023-116864 filed Jul. 18, 2023, the entire contents of which are herein incorporated by reference.

FIELD

The present disclosure relates to a vehicle control device and a vehicle control system.

BACKGROUND

When a vehicle is to exit from a traveling road on which the vehicle is currently traveling onto a branching road, the automatic control device of the vehicle defines a lane change completion location on the target lane within the traveling road, which is adjacent to the lane on the branching road. The lane change completion location is a location on the target lane where the vehicle is to complete movement to the lane on the branching road. When the vehicle is traveling on another lane other than the target lane within the traveling road, the vehicle moves to the target lane, moving to the lane of the branching road up to the lane change completion location.

When a congested zone exists between the current location of the vehicle and the lane change completion location, however, it may be difficult to ensure a safe distance between the vehicle and other vehicles within the congested zone while the vehicle moves between lanes by automatic control.

Therefore, when the vehicle is to move to a target lane, a lane change may be carried out to move the vehicle to the target lane after the vehicle has passed through the congested zone, or a lane change may be carried out to move the vehicle to the target lane before the vehicle reaches the congested zone (see Japanese Patent Publication No. 7123645, for example).

SUMMARY

When a lane change is to be carried out to move the vehicle to the target lane after the vehicle has passed through the congested zone, it may not be possible to carry out the lane change by automatic control if the distance between the vehicle and the lane change completion location is too short.

It is therefore an object of the present disclosure to provide a vehicle control device that, when a difficult traveling zone exists between the current location of the vehicle and a lane change completion location, can decide whether to carry out a lane change for movement of the vehicle to a target lane before or after the congested zone.

(1) One embodiment of the present disclosure provides a vehicle control device. The vehicle control device has a processor configured to determine whether or not a difficult traveling zone where traveling of the vehicle is difficult exists between a lane change completion location which is set on a target lane as one lane of a road having multiple lanes and where movement of the vehicle from the target lane to another lane is to be completed and a current location of the vehicle, calculate a first distance between an end point of the difficult traveling zone in the traveling direction of the vehicle and the lane change completion location, when it has been determined that the difficult traveling zone exists, determine whether or not the first distance is at least a reference distance, and decide to execute a lane change for movement of the vehicle to the target lane after the vehicle has passed through the difficult traveling zone when it has been determined that the first distance is at least the reference distance or to decide to execute a lane change for movement of the vehicle to the target lane before the vehicle reaches the difficult traveling zone when it has been determined that the first distance is less than the reference distance.

(2) The vehicle control device of embodiment (1) above, the processor is further configured to determine whether or not the vehicle is located in the difficult traveling zone, when it has been decided to execute a lane change for movement of the vehicle into the target lane after the vehicle has passed through the difficult traveling zone, determine whether or not the current location of the vehicle is located in the target lane, when it has been determined that the vehicle is located within the difficult traveling zone, determine whether or not a newly calculated first distance is less than the reference distance, when it has been determined that the current location of the vehicle is not located in the target lane, and determine whether or not the first distance is equal to or greater than a second distance that allows a driver to move the vehicle into the target lane by manual control, when it has been determined that the first distance is less than the reference distance.

(3) The vehicle control device of embodiment (2) above, the processor is further configured to notify the driver of a lane change request for movement of the vehicle to the target lane by manual control via a notification unit, when it has been determined that the first distance is equal to or greater than the second distance.

(4) The vehicle control device of any one of embodiments (1) to (3) above, a reference distance is set for each lane of multiple lanes of the road on which the vehicle is traveling so that the reference distance is longer further from the target lane, and the processor is further configured to calculate the first distance between the end point of the difficult traveling zone on the traveling direction side of the vehicle and the lane change completion location for each of the multiple lanes, determine whether or not the first distance is at least the reference distance for each of the multiple lanes, and decide to execute a lane change for movement of the vehicle into the target lane after the vehicle has passed through the difficult traveling zone when it has been determined that the first distance is at least the reference distance for every one of the multiple lanes.

(5) Yet another embodiment provides a vehicle control system. The vehicle control system has a vehicle having a first processor, and a server having a second processor, wherein the first processor or second processor is configured to determine whether or not a difficult traveling zone where traveling of the vehicle is difficult exists between a lane change completion location which is set on a target lane as one lane of a road having multiple lanes and where movement of the vehicle from the target lane to another lane is to be completed and a current location of the vehicle, the first processor or second processor is configured to calculate a first distance between an end point of the difficult traveling zone in the traveling direction of the vehicle and the lane change completion location, when it has been determined that a difficult traveling zone exists, the first processor or second processor is configured to determine whether or not the first distance is at least a reference distance, the first processor or second processor is configured to decide to execute a lane change for movement of the vehicle to the target lane after the vehicle has passed through the difficult traveling zone when it has been determined that the first distance is at least the reference distance, or to decide to execute a lane change for movement of the vehicle to the target lane before the vehicle reaches the difficult traveling zone when it has been determined that the first distance is less than the reference distance, and the first processor executes at least one of the processing operations while the second processor executes the remaining processing operations, or the second processor executes at least one of the processing operations while the first processor executes the remaining processing operations.

When a difficult traveling zone exists between a current location of the vehicle and a lane change completion location, the vehicle control device of the present disclosure can decide whether to carry out a lane change for movement of the vehicle to a target lane before or after the difficult traveling zone, thus having an effect of allowing a predetermined lane change to be carried out up to the lane change completion location.

The object and advantages of the present disclosure will be realized and attained by the elements and combinations particularly specified in the claims. It is to be understood that both the foregoing general description and the following detailed description are exemplary and explanatory and are not restrictive of the present disclosure, as claimed.

BRIEF DESCRIPTION OF DRAWINGS

FIG. 3 is a sequence diagram for vehicle control processing in a vehicle control system.

FIG. 4 is a general schematic drawing of a vehicle in which a traveling lane planning device is mounted.

FIG. 5 is an example of an operation flow chart for vehicle control processing by a traveling lane planning device.

FIG. 6 is an example of another operation flow chart for vehicle control processing by a traveling lane planning device.

DESCRIPTION OF EMBODIMENTS

Figure 1:
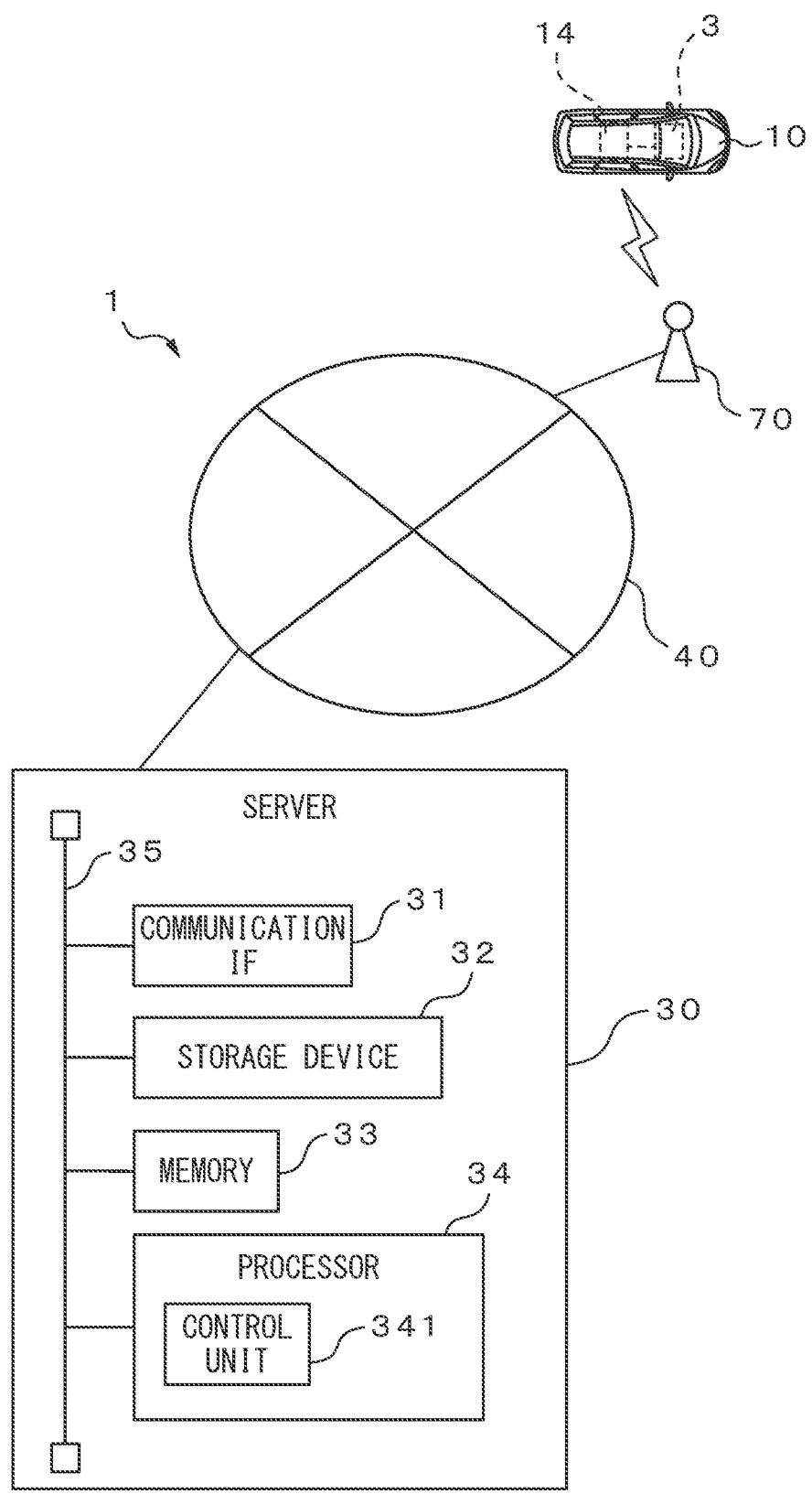
FIG. 1 is a general schematic drawing of a vehicle control system in which a traveling lane planning device is mounted.

FIG. 1 is a general schematic drawing of a vehicle control system 1 in which a traveling lane planning device 14 of the embodiment is mounted. The vehicle control system 1 of the embodiment has at least a vehicle 10 and a server 30. A communication device 3 and the traveling lane planning device 14 are mounted in the vehicle 10. For example, by accessing a wireless base station 70 (hereunder also known as a macrocell base station 70) which provides macrocells connected with the server 30 via a communication network 40 and gateway (not shown), the vehicle 10 is placed in connection with the server 30 via the macrocell base station 70 and communication network 40.

Although only one vehicle 10 is depicted in FIG. 1, the vehicle control system 1 may have more than one vehicle 10. Likewise, more than one macrocell base station 70 may be connected to the communication network 40.

Figure 2:
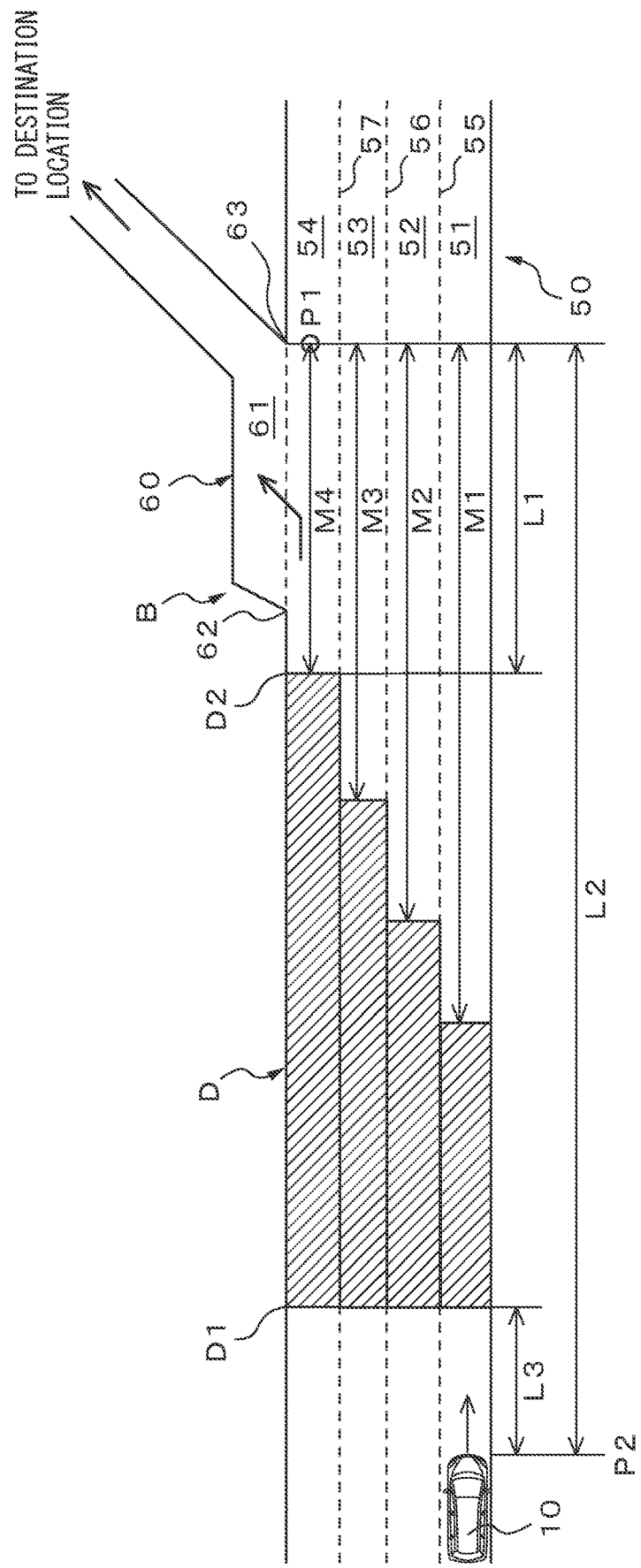
FIG. 2 is a diagram illustrating operation of a traveling lane planning device in a vehicle control system, in overview.

FIG. 2 is a diagram illustrating operation of the traveling lane planning device 14 in the vehicle control system 1, in overview. Specifically, the traveling lane planning device 14 selects a lane within the road on which the vehicle 10 is traveling, in the nearest driving zone selected from the navigation route, and creates a traveling lane plan representing a scheduled traveling lane on which the vehicle 10 is to travel. The traveling lane planning device 14 can communicate with the server 30 via the macrocell base station 70 and communication network 40, using the communication device 3. The traveling lane planning device 14 is an example of a vehicle control device.

The vehicle 10 is traveling on a road 50 and is scheduled to exit from a branching location B to a road 60 to proceed toward the destination location.

The road 50 has four lanes 51, 52, 53, 54. The lane 51 and lane 52 are divided by a lane marking line 55, the lane 52 and lane 53 are divided by a lane marking line 56, and the lane 53 and lane 54 are divided by a lane marking line 57. The traffic lane 54 of the road 50 and the lane 61 of the road 60 are connected between a branch start location 62 and a branch end location 63, at the branching location B.

The vehicle 10 is currently traveling in the lane 51. According to the traveling lane plan, after having made three lane changes to move from the lane 51 to the lane 54, the vehicle 10 is scheduled to move from the lane 54 of the road 50 to the lane 61 of the road 60. The lane 54 is an example of a target lane.

The traveling lane planning device 14 sets on the lane 54 a lane change completion location P1 where movement of the vehicle 10 from the lane 54 onto the lane 61 is to be completed. In the example shown in FIG. 1, the lane change completion location P1 matches the branch end location 63 in the traveling direction of the vehicle 10. The traveling lane planning device 14 generates a lane change plan for movement from the lane 54 to the lane 61 before it reaches the lane change completion location P1.

FIG. 3 is a sequence diagram for vehicle control processing in a vehicle control system 1. First, the traveling lane planning device 14 uses the communication device 3 to send an information request for zone information, to the server 30 via the macrocell base station 70 and communication network 40 (step S101).

The zone information represents the location of the difficult traveling zone D where traveling of the vehicle 10 is difficult. The difficult traveling zone D may be, for example, a congested zone, a frozen-road zone or a construction zone.

The traveling lane planning device 14 sends an information request to the server 30 when the distance L2 between the current location P2 of the vehicle 10 and the lane change completion location P1 has reached a predetermined distance (such as 2 km). The information request may include the current location of the vehicle 10, the navigation route of the vehicle 10, and the lane change completion location.

The server 30 then sends zone information based on the current location of the vehicle 10 to the traveling lane planning device 14, via the communication network 40 and macrocell base station 70 (step S102).

In the example shown in FIG. 2, the difficult traveling zone D, which is a congested zone, exists between start point D1 and end point D2 in the traveling direction of the vehicle 10. The difficult traveling zone D is located between the lane change completion location P1 and the current location P2 of the vehicle 10.

The traveling lane planning device 14 then determines that a difficult traveling zone D for the vehicle exists between the lane change completion location P1 and the current location P2 of the vehicle 10 (step S103).

Next, the traveling lane planning device 14 calculates the remaining distance L1 between the end point D2 of the difficult traveling zone D in the traveling direction of the vehicle 10, and the lane change completion location P1 (step S104). The remaining distance L1 is the distance remaining for the vehicle 10 up to the lane change completion location P1, after the vehicle 10 has passed through the difficult traveling zone D. The remaining distance L1 is an example of a first distance.

Next, the traveling lane planning device 14 determines that the remaining distance L1 is at least a reference distance (step S105). The reference distance is decided based on the distance required for the vehicle 10 to make a lane change by automatic control. The reference distance is decided based on the number of lane changes required for the vehicle 10 to move from the lane in which the vehicle 10 is traveling to the lane 54 at the lane change completion location (target lane).

When the first distance L1 is at least the reference distance, the traveling lane planning device 14 decides to carry out a lane change for movement of the vehicle 10 to the lane 54, after the vehicle 10 has passed through the difficult traveling zone D (step S106). When the first distance L1 is at least the reference distance, the distance between the lane change completion location P1 and the current location P2 of the vehicle 10 will be sufficiently long at the moment the vehicle 10 has passed through the difficult traveling zone D, and therefore presumably the vehicle 10 can move from the lane in which the vehicle 10 is traveling to the target lane by automatic control.

When the remaining distance L1 is less than the reference distance, on the other hand, the traveling lane planning device 14 decides to carry out a lane change for movement of the vehicle 10 to the target lane, before the vehicle 10 passes into the difficult traveling zone D (step S106). When the remaining distance L1 is less than the reference distance, the distance between the lane change completion location P1 and the current location P2 of the vehicle 10 will be too short at the moment the vehicle 10 has passed through the difficult traveling zone D, and therefore presumably it will be difficult for the vehicle 10 to move to the target lane by automatic control.

With the vehicle control system 1 of the embodiment described above, when a difficult traveling zone D exists between the current location P2 of the vehicle 10 and the lane change completion location P1, it is decided whether to carry out lane change for movement of the vehicle 10 to the target lane before or after the congested zone. The vehicle control system 1 can thus carry out the lane change up to the lane 61 before the lane change completion location P1.

The vehicle control system 1 may include more than one vehicle 10, but since each vehicle has the same construction and conducts the same processing for vehicle control processing, the following explanation will assume only a single vehicle 10.

The vehicle 10 in which the traveling lane planning device 14 is mounted will now be explained with reference to FIG. 4. FIG. 4 is a general schematic drawing of a vehicle 10 in which the traveling lane planning device 14 is mounted.

The vehicle 10 has a camera 2, a communication device 3, a positioning information receiver 4, a navigation device 5, a user interface (UI) 6, a map information storage device 11, a location estimating device 12, an object detector 13, a traveling lane planning device 14, a drive planning device 15 and a vehicle control device 16.

The camera 2, communication device 3, positioning information receiver 4, navigation device 5, UI 6, map information storage device 11, location estimating device 12, object detector 13, traveling lane planning device 14, drive planning device 15 and vehicle control device 16 are connected in a communicable manner through an in-vehicle network 17 that conforms to controller area network standards.

The camera 2 is mounted inside the vehicle 10 and directed toward the front of the vehicle 10. The camera 2, for example, acquires a camera image in which the environment of a predetermined region ahead of the vehicle 10 is shown, at a predetermined cycle. The camera image can show the road in the predetermined region ahead of the vehicle 10, and road features such as surface lane marking lines on the road. A camera image acquired by the camera 2 may also include another vehicle which is located in front of the vehicle 10.

The camera 2 has a 2D detector composed of an array of photoelectric conversion elements with visible light sensitivity, such as a CCD or C-MOS, and an imaging optical system that forms an image of the photographed region on the 2D detector. The camera image is an example of environment information representing the environment ahead of the vehicle 10.

Each time a camera image is acquired, the camera 2 outputs the camera image and the camera image acquisition time at which the camera image was acquired, through the in-vehicle network 17 to the location estimating device 12 and object detector 13. The camera image is also used for processing at the location estimating device 12 to estimate the location of the vehicle 10. At the object detector 13, the camera image is used for processing to detect other objects surrounding the vehicle 10.

The communication device 3 is an example of a device communication unit, and it has an interface circuit for connecting the traveling lane planning device 14 to a macrocell base station 70. The communication device 3 is configured in a communicable manner with the server 30 via the macrocell base station 70 and communication network 40.

The positioning information receiver 4 outputs positioning information that represents the current location of the vehicle 10. The positioning information receiver 4 may be a GNSS receiver, for example. The positioning information receiver 4 outputs positioning information and the positioning information acquisition time at which the positioning information has been acquired, to the navigation device 5 and map information storage device 11, each time positioning information is acquired at a predetermined receiving cycle.

Based on the navigation map information, the destination location of the vehicle 10 input through the UI 6, and positioning information representing the current location of the vehicle 10 input from the positioning information receiver 4, the navigation device 5 creates a navigation route from the current location to the destination location of the vehicle 10. The navigation route includes information relating to the locations of right turns, left turns, merging and branching. When the destination location has been newly set or the current location of the vehicle 10 has exited the navigation route, the navigation device 5 creates a new navigation route for the vehicle 10. Every time a navigation route is created, the navigation device 5 outputs the navigation route to the location estimating device 12 and the traveling lane planning device 14, via the in-vehicle network 17.

The UI 6 is an example of the notification unit. The UI 6, controlled by the navigation device 5 and traveling lane planning device 14, notifies the driver of the vehicle 10 traveling information. The traveling information of the vehicle 10 includes information relating to the current location of the vehicle, execution of lane changes, and the current and future route of the vehicle, such as the navigation route. The UI 6 has a display device 6a such as a liquid crystal display or touch panel, for display of the traveling information. The UI 6 may also have an acoustic output device (not shown) to notify the driver of traveling information. The UI 6 also creates an operation signal in response to operation of the vehicle 10 by the driver. The operation information may be, for example, a destination location, transit points, vehicle speed or other control information. The UI 6 also has a touch panel or operating button, for example, as an input device for inputting operation information from the driver to the vehicle 10. The UI 6 outputs the input operation information to the navigation device 5 and the traveling lane planning device 14, via the in-vehicle network 17.

The map information storage device 11 stores wide-area map information for a relatively wide area (an area of 10 to 30 $km^2$, for example) that includes the current location of the vehicle 10. In some embodiments, the map information has high-precision map information including three-dimensional information for the road surface, the speed limit for the road, the curvature of the road, and information for the types and locations of structures and road features such as road lane marking lines.

The map information storage device 11 receives the wide-area map information from the external server 30 via a macrocell base station 70, by wireless communication through a communication device 3 mounted in the vehicle 10, in relation to the current location of the vehicle 10, and stores it in the storage device. Each time positioning information is input from the positioning information receiver 4, the map information storage device 11 refers to the stored wide-area map information and outputs map information for a relatively narrow area including the current location represented by the positioning information (for example, an area of 100 $m^2$ to 10 $km^2$), through the in-vehicle network 17 to the location estimating device 12, object detector 13, traveling lane planning device 14 and drive planning device 15.

The location estimating device 12 estimates the location of the vehicle 10 at the camera image acquisition time, based on the road features surrounding the vehicle 10 represented in the camera image acquired by the camera 2. For example, the location estimating device 12 compares lane marking lines identified in the camera image with lane marking lines represented in the map information input from the map information storage device 11, and determines the estimated location and estimated declination of the vehicle 10 at the camera image acquisition time. The location estimating device 12 estimates the road traveling lane where the vehicle 10 is located, based on the lane marking lines represented in the map information and on the estimated location and estimated declination of the vehicle 10. Each time the estimated location, estimated declination and traveling lane of the vehicle 10 are determined at the camera image acquisition time, the location estimating device 12 outputs this information to the object detector 13, traveling lane planning device 14 and drive planning device 15.

The object detector 13 detects objects around the vehicle 10 and their types (for example, vehicles) based on the camera image, for example. Other objects also include other vehicles traveling around the vehicle 10. The object detector 13 tracks detected objects and determines the trajectories and speeds of the other objects. The object detector 13 identifies the traveling lanes in which the objects are traveling, based on the lane marking lines represented in the map information and the locations of the objects. The object detector 13 also outputs object detection information which includes information representing the types of objects that were detected, information indicating their locations and speeds, and also information indicating their traveling lanes, to the traveling lane planning device 14 and drive planning device 15.

The traveling lane planning device 14 carries out plan processing, determination processing, calculation processing, decision processing and control processing. The traveling lane planning device 14 has a communication interface (IF) 21, a memory 22 and a processor 23 for this purpose. The communication interface 21, memory 22 and processor 23 are connected via signal wires 24. The communication interface 21 has an interface circuit to connect the traveling lane planning device 14 with the in-vehicle network 17.

The memory 22 is an example of a storage unit, and it has a volatile semiconductor memory and a non-volatile semiconductor memory, for example. The memory 22 stores an application computer program and various data to be used for information processing carried out by the processor 23.

All or some of the functions of the traveling lane planning device 14 are functional modules driven by a computer program operating on the processor 23, for example. The processor 23 has a planning unit 231, a determining unit 232, a calculating unit 233, a deciding unit 234 and a control unit 235. Alternatively, the functional module of the processor 23 may be a specialized computing circuit in the processor 23. The processor 23 comprises one or more CPUs (Central Processing Units) and their peripheral circuits. The processor 23 may also have other computing circuits such as a logical operation unit, numerical calculation unit or graphics processing unit. The traveling lane planning device 14 is an electronic control unit (ECU), for example.

At a traveling lane-planning creation time set in a predetermined cycle, the planning unit 231 selects a traffic lane on the road on which the vehicle 10 is traveling, within the nearest driving zone (for example, 10 km) selected from the navigation route, based on the map information, the navigation route and surrounding environment information and the current location of the vehicle 10, and creates a traveling lane plan representing the scheduled traveling lane for traveling of the vehicle 10. The surrounding environment information includes the locations and speeds of other vehicles traveling around the vehicle 10. For example, the traveling lane planning device 14 creates a traveling lane plan for the vehicle 10 to travel on a traffic lane other than a passing traffic lane. Each time a traveling lane plan is created, the traveling lane planning device 14 outputs the traveling lane plan to the drive planning device 15.

The planning unit 231 also determines whether or not a lane change is necessary within the nearest driving zone selected from the navigation route, based on the traveling lane plan, the map information, the navigation route and the current location of the vehicle 10, and generates a lane change plan in accordance with the determination results. Specifically, the planning unit 231 determines whether or not a lane change is necessary for moving to a traffic lane toward the destination location of the vehicle 10, based on the navigation route and the current location of the vehicle 10. It is determined whether or not the vehicle 10 is approaching another road that merges ahead from the traveling road on which it is currently traveling (merge), or the vehicle 10 is exiting onto another road branching out ahead from the traveling road (branch). Since merging and branching involve movement of the vehicle from a lane of the traveling road to a lane in another road, a lane change is carried out.

The planning unit 231 may further utilize surrounding environment information or vehicle status information to determine whether or not a lane change is necessary. The vehicle status information includes the current location of the vehicle 10, and the vehicle speed, acceleration and traveling direction. The traveling lane planning device 14 may also generate lane change plans in response to requests for movement between lanes by the driver.

When it has determined that a lane change is necessary, the planning unit 231 decides on the target lane and destination lane before moving. The planning unit 231 sets on the target lane a lane change completion location where movement of the vehicle from the target lane to the other lane is to be completed. The planning unit 231 also generates a lane change plan that includes moving the vehicle 10 from the lane in which it is traveling to the target lane, and moving the vehicle 10 from the target lane to another lane before it reaches the lane change completion location. When a lane change plan has been generated, the planning unit 231 outputs the traveling lane plan with the added lane change plan to the drive planning device 15.

The planning unit 231 sends an information request to the server 30 when the distance between the current location of the vehicle 10 and the lane change completion location (distance L2 in FIG. 2) has reached a predetermined distance (such as 2 km). In some embodiments, the predetermined distance is a distance that allows the vehicle 10 to move to the target lane before the vehicle 10 reaches the start point of the difficult traveling zone. The predetermined distance is decided based on the distance required for the vehicle 10 to make a lane change by automatic control. The predetermined distance is decided based on the number of lane changes required for the vehicle 10 to move from the lane in which it is traveling to the lane (target lane) at the lane change completion location (target lane).

The planning unit 231 may also receive traffic information including the current locations and speeds of other vehicles, from other vehicles located in a predetermined range from the vehicle 10, via the communication device 3. Based on traffic information, the planning unit 231 determines the average speed and average intervehicular distance for the road in which the vehicle 10 is traveling, and for each lane of the road. The planning unit 231 may also decide that a zone in which the average speed is below a reference speed, or the average intervehicular distance is a reference intervehicular distance, is a difficult traveling zone. In this case the traveling lane planning device 14 does not need to receive zone information from the server 30. Other operations carried out by the traveling lane planning device 14 are described below.

At a driving plan creation time set with a predetermined cycle, the drive planning device 15 carries out driving plan processing in which it creates a driving plan representing the scheduled traveling trajectory of the vehicle 10 up until a predetermined time (for example, 5 seconds), based on the traveling lane plan, the map information, the current location of the vehicle 10, the surrounding environment information and the vehicle status information. The driving plan is represented as a combination of the target location of the vehicle 10 and the target vehicle speed at the target location, at each time from the current time until the predetermined time. The drive planning device 15 generates a driving plan to maintain a spacing of at least a predetermined distance between the vehicle 10 and other vehicles. The drive planning device 15 outputs the driving plan to the vehicle control device 16 for each driving plan generated.

The vehicle control device 16 controls each unit of the vehicle 10 based on the current location of the vehicle 10 and the vehicle speed and yaw rate, as well as on the driving plan generated by the drive planning device 15. For example, the vehicle control device 16 determines the steering angle, acceleration and angular acceleration of the vehicle 10 according to the driving plan and the speed and yaw rate of the vehicle 10, and sets the amount of steering, and the accelerator or brake level so as to match that steering angle, accelerator level and angular acceleration. The vehicle control device 16 also outputs a control signal corresponding to a set steering amount, to an actuator (not shown) that controls the steering wheel for the vehicle 10, via the in-vehicle network 17. The vehicle control device 16 also outputs a control signal corresponding to the set accelerator level, to a drive unit such as an engine or motor (not shown) of the vehicle 10, via the in-vehicle network 17. Alternatively, the vehicle control device 16 may output a control signal corresponding to a set brake level to the brake (not shown) of the vehicle 10, via the in-vehicle network 17.

For FIG. 4, the map information storage device 11, location estimating device 12, object detector 13, traveling lane planning device 14, drive planning device 15 and vehicle control device 16 were explained as separate devices, but all or some of them may be constructed in a single device.

The hardware configuration of the server 30 will now be described with reference to FIG. 1. The server 30 carries out control processing. For this purpose, the server 30 comprises a communication interface (IF) 31, a storage device 32, a memory 33 and a processor 34. The communication IF 31, storage device 32 and memory 33 are connected with the processor 34 via signal wires 35. The server 30 may also comprise an input device such as a keyboard and mouse, and a display device such as a liquid crystal display.

The communication IF 31 has an interface circuit to connect the server 30 with the communication network 40. The communication IF 31 is configured in a communicable manner with the vehicle 10, via the communication network 40 and macrocell base station 70. The communication IF 31 is an example of a server communication unit.

The storage device 32 has, for example, a hard disk device or optical recording medium, and a device for accessing it. The storage device 32 also stores traffic information received via the communication network 40. The storage device 32 may further store identification information for identification of the vehicle 10. The storage device 32 may still further store a computer program for carrying out processing by the server 30 related to vehicle control processing, which is carried out in the processor 34. The storage device 32 may also store map information including a navigation map. The storage device 32 is an example of a storage unit.

The memory 33 has a volatile semiconductor memory and a non-volatile semiconductor memory, for example. The memory 33 stores an application computer program and various data to be used for information processing carried out by the processor 34 of each device. Traffic information may also be stored in the memory 33. The memory 33 is also an example of a storage unit.

All or some of the functions of the server 30 are functional modules carried out by a computer program operating on the processor 34, for example. The processor 34 has a control unit 341. Alternatively, the functional module of the processor 34 may be a specialized computing circuit in the processor 34. The processor 34 comprises one or more CPUs (Central Processing Units) and their peripheral circuits. The processor 34 may also have other computing circuits such as a logical operation unit, numerical calculation unit or graphics processing unit.

The control unit 341 decides on the location of the difficult traveling zone based on traffic information received via the communication network 40. The traffic information may be, for example, the current locations and speeds of vehicles as received from vehicles traveling on different roads. Based on the traffic information, the control unit 341 determines the average speed and average intervehicular distance for each road or for each road lane. The control unit 341 also decides that a zone in which the average speed is below a reference speed, or the average intervehicular distance is a reference intervehicular distance, is a difficult traveling zone. The difficult traveling zone may be decided for each road or for each road lane. The difficult traveling zone is represented as a zone between the start point and the end point.

The traffic information used may be vehicle speed detected by a vehicle detection device installed on each road. The traffic information used may also be locations of zones with ongoing construction in each road. The traffic information used may also be locations of zones with frozen sections on each road. The control unit 341 inputs the traffic information via the communication network 40.

The control unit 341 may also decide that a zone estimated to be congested is a congested zone, based on the map information. For example, if another branching location exists before the branching location where the vehicle 10 is to exit in the navigation route for the vehicle 10, a difficult traveling zone may be decided on before the other branching location. The difficult traveling zone may also be decided as the entire road, if the road has multiple lanes. Alternatively, difficult traveling zones may be decided for each of multiple lanes, if the road has multiple lanes.

When an information request is received from the traveling lane planning device 14, the control unit 341 refers to the navigation route of the vehicle 10, and if a difficult traveling zone exists in the traveling direction from the current location of the vehicle 10, it sends zone information representing the location of the difficult traveling zone to the traveling lane planning device 14. The zone information includes, for example, the location of the difficult traveling zone within a predetermined range of the navigation route from the current location of the vehicle 10.

FIG. 5 is an example of an operation flow chart for vehicle control processing by a traveling lane planning device 14. Vehicle control processing by the traveling lane planning device 14 will now be described with reference to FIG. 5. When a lane change has been scheduled for the vehicle 10, the traveling lane planning device 14 carries out vehicle control processing according to the operation flow chart shown in FIG. 5, each time zone information representing the location of a difficult traveling zone is received. When the road in which the vehicle 10 is traveling has only a single lane, the processing in FIG. 5 is not necessary. The processing in FIG. 5 is also unnecessary when the vehicle 10 is traveling in the target lane.

The determining unit 232 first determines whether or not a difficult traveling zone D exists between the lane change completion location and the current location of the vehicle 10, where traveling of the vehicle 10 is difficult (step S201). Specifically, the determining unit 232 acquires a start point for the difficult traveling zone represented in the zone information. When a start point for a difficult traveling zone exists between the lane change completion location and the current location of the vehicle 10, the determining unit 232 determines that a difficult traveling zone exists between the lane change completion location and the current location of the vehicle 10.

When a difficult traveling zone D exists between the lane change completion location and the current location of the vehicle 10 (step S201—Yes), the calculating unit 233 calculates the remaining distance between the end point of the difficult traveling zone and the lane change completion location (step S202). The remaining distance is the distance in the traveling direction of the vehicle 10.

Even if the road has multiple lanes, there will only be one end point of the difficult traveling zone, if one end point of the difficult traveling zone has been decided on for the entire road. If end points of difficult traveling zones have been decided on for each of the multiple lanes, on the other hand, the closest end point to the lane change completion location is used for calculation of the remaining distance. The remaining distance is calculated as a distance along the traveling direction of the vehicle 10. If the end point of the difficult traveling zone is further toward the traveling direction of the vehicle 10 side than the lane change completion location in the traveling direction of the vehicle 10, then the remaining distance is zero.

In the example shown in FIG. 2, end points of difficult traveling zones are decided for each of multiple lanes. The calculating unit 233 calculates the remaining distance for each of multiple lanes, for each lane between the end point of the difficult traveling zone in the traveling direction of the vehicle 10 side and the lane change completion location P1.

The remaining distance on lane 51 is M1, the remaining distance on lane 52 is M2, the remaining distance on lane 53 is M3 and the remaining distance on lane 54 is M4.

The determining unit 232 then determines whether or not the remaining distance is at least the reference distance (step S203). The reference distance is decided based on the distance required for the vehicle 10 to make a lane change by automatic control. In some embodiments, the reference distance is decided based on the number of lane changes required for the vehicle 10 to move from the lane in which the vehicle 10 is traveling to the target lane. The reference distance is decided according to the lane in which the vehicle 10 is traveling.

In the example shown in FIG. 2, difficult traveling zones are decided for each of the multiple lanes 51 to 54. The reference distance is set for each lane so that the reference distance is longer with greater distance from the lane 54, for each of the multiple lanes 51 to 54.

If the vehicle 10 moves from the lane 54 to the lane 61 after it has moved from the lane 51 to the lane 54 which is the target lane, then the total number of lane changes is 4. The reference distance for the lane 51 is the distance required for the vehicle 10 to make four lane changes by automatic control. Similarly, the reference distance for the lane 52 is the distance required for the vehicle 10 to make three lane changes by automatic control. The reference distance for the lane 53 is the distance required for the vehicle 10 to make two lane changes by automatic control. The reference distance for the lane 54 is the distance required for the vehicle 10 to make one lane change by automatic control.

The reference distance may also be the sum of the distance required for the vehicle 10 to make a lane change by automatic control and a predetermined offset distance. The reference distance may also be decided based on the distance between the current location of the vehicle 10 and the lane change completion location.

In some embodiments, since the reference distance is the distance used for lane change of the vehicle 10, any "non-movable zone" where movement between lanes is not possible is not included in the reference distance. Such a non-movable zone may be a zone where movement between lanes is illegal, or a construction zone. Non-movable zones include zones where movement of a vehicle between lanes cannot be safely controlled by automatic control (on a sharp curve, for example), merge zones where other vehicles are merging in, zones where lane changes are prohibited by the driver, and zones where movement between lanes is physically prohibited.

In some embodiments, when a zone between a non-movable zone and another non-movable zone adjacent to that non-movable zone is equal to or less than the distance required for the vehicle 10 to change lanes by automatic control, the zone between them is also added as a non-movable zone.

A reference zone is the sum of the distance required for the vehicle 10 to change lanes by automatic control, and the non-movable zone. In the example shown in FIG. 2, the reference distance is decided based on the current lane in which the vehicle 10 is traveling within the road. For each of multiple lanes, the determining unit 232 determines whether or not the remaining distance for each lane is at least the reference distance for each lane.

When the remaining distance is at least the reference distance (step S203—Yes), the deciding unit 234 decides to carry out a lane change for movement of the vehicle 10 to the target lane, after the vehicle 10 has passed through the difficult traveling zone (step S204), and the series of processing steps is complete. The planning unit 231 generates a traveling lane plan based on the decision by the deciding unit 234.

When the road has multiple lanes, determination by the deciding unit 234 is carried out in the following manner. When the deciding unit 234 which has determined for every one of the multiple lanes that the remaining distance is at least the reference distance, it decides to carry out a lane change for movement of the vehicle 10 to the target lane, after the vehicle 10 has passed through the difficult traveling zone.

When the remaining distance is less than the reference distance (step S203—No), on the other hand, the deciding unit 234 decides to carry out a lane change for movement of the vehicle 10 to the target lane, before the vehicle 10 passes into the difficult traveling zone (step S205), and the series of processing steps is complete. The planning unit 231 generates a traveling lane plan based on the decision by the deciding unit 234.

When the road has multiple lanes, determination by the deciding unit 234 is carried out in the following manner. When it has been determined that the remaining distance is less than the reference distance for any one of the multiple lanes, the deciding unit 234 decides to carry out a lane change for movement of the vehicle 10 to the target lane, before the vehicle 10 passes into the difficult traveling zone.

The control unit 235 notifies the driver, via the UI 6, that the vehicle 10 is scheduled to execute a lane change for movement into the target lane, after the vehicle 10 has passed through the difficult traveling zone. The control unit 235 may also notify the driver via the UI 6 that executing a lane change while the vehicle 10 is traveling in the difficult traveling zone may potentially cause more congestion. If it is desired for the vehicle 10 to make a lane change before the vehicle 10 passes through the difficult traveling zone, then the control unit 235 may further notify the driver via the UI 6 that the driver may operate the vehicle 10 by manual control.

When no difficult traveling zone exists between the lane change completion location and the current location of the vehicle 10 (step S201—No), the series of processing steps is complete. The control unit 235 may also notify the driver via the UI 6 that the vehicle 10 is not to make a lane change for movement to the target lane by automatic control, after the vehicle 10 has passed through the difficult traveling zone.

When the traveling lane planning device 14 decides on the location of the difficult traveling zone, the operation flow chart shown in FIG. 5 may be carried out at a time point where a lane change is scheduled and the current location of the vehicle 10 and the start point of the difficult traveling zone have reached a predetermined distance (distance L3 in FIG. 2). The predetermined distance used may be the reference distance mentioned above. This will allow the determining unit 232 to determine that a difficult traveling zone exists between the lane change completion location and the current location of the vehicle 10.

A concrete example of a lane change for the vehicle 10 will now be explained with reference to FIG. 2. The following explanation concerns a situation where it has been decided that the vehicle 10 is to execute a lane change for movement into the lane 54 after the vehicle 10 has passed through the difficult traveling zone D. The vehicle 10 travels on the lane 51 and passes through the difficult traveling zone D. The vehicle 10 has decided on a difficult traveling zone D for each of the multiple lanes 51 to 54 of the road 50, and therefore the vehicle 10 moves from the lane 51 to the target lane 54 after the vehicle 10 has passed through the difficult traveling zone of the lane 51. The vehicle 10 also moves from the lane 54 to the lane 61.

Suppose that the vehicle 10 is traveling in the lane 52 for which a difficult traveling zone has been decided, and no difficult traveling zone has been decided for the lane 51 which is adjacent to the lane 52. In this case, the vehicle 10 moves from the lane 52 into the lane 51 and passes through the difficult traveling zone of the lane 51. The vehicle 10 may also begin a lane change for movement from the lane 51 to the lane 61.

The following explanation concerns a situation where it has been decided that the vehicle 10 is to execute a lane change for movement into a target lane before the vehicle 10 reaches the difficult traveling zone D. The vehicle 10 moves from the lane 51 into the lane 54 before reaching the difficult traveling zone D. The vehicle 10 travels in the lane 54 and moves from the lane 54 to the lane 61 after having passed through the difficult traveling zone D.

Incidentally, the length of a difficult traveling zone may vary as time passes. For example, the length of a congested zone may vary with the passage of time. Therefore, even if it has been decided that the vehicle 10 is to execute a lane change for movement to the target lane after the vehicle 10 has passed through the difficult traveling zone, there remains a possibility that the difficult traveling zone may lengthen, shortening the remaining distance, while the vehicle 10 is traveling in the difficult traveling zone. In such cases, the vehicle 10 may not be able to make a lane change to the target lane by automatic control. The traveling lane planning device 14 may therefore confirm the remaining distance even while the vehicle 10 is traveling in the difficult traveling zone, in the following manner.

FIG. 6 is an example of another operation flow chart for vehicle control processing of a traveling lane planning device. The vehicle control processing shown in FIG. 6 is carried out at a vehicle control time with a predetermined cycle, when it has been decided that the vehicle 10 is to execute a lane change for movement into the target lane after the vehicle 10 has passed through the difficult traveling zone. The vehicle control processing shown in FIG. 6 may also be carried out before the vehicle 10 reaches the lane change completion location, for example.

The determining unit 232 first determines whether or not the vehicle 10 is located in a difficult traveling zone, based on the current location of the vehicle 10 and the location of the difficult traveling zone (step S301).

When the vehicle 10 is located in a difficult traveling zone (step S301—Yes), it is determined whether or not the current location of the vehicle 10 is in the target lane (step S302).

If the current location of the vehicle is not in the target lane (step S302—No), the determining unit 232 determines whether or not the remaining distance newly calculated by the calculating unit 233 is less than a reference distance (step S303). In some cases a difficult traveling zone may lengthen, shortening the remaining distance, while the vehicle 10 is traveling in the difficult traveling zone. If the remaining distance is less than the reference distance, it is possible that the vehicle 10 may not be able to move to the target lane by automatic control after the vehicle 10 has passed through the difficult traveling zone. The calculating unit 233 therefore calculates the remaining distance between the current end point of the difficult traveling zone and the lane change completion location. The determining unit 232 determines the relationship between the newly calculated remaining distance and the reference distance.

When the remaining distance is less than the reference distance (step S303—Yes), the determining unit 232 determines whether or not the remaining distance is at least a "manual control distance" which allows the driver to move the vehicle 10 into the target lane by manual control (step S304). The manual control distance is decided based on the distance required for the vehicle 10 to make a lane change by manual control. The manual control distance is decided based on the number of lane changes required for the vehicle 10 to move from the lane in which the vehicle 10 is traveling to the lane at the lane change completion location (the target lane). The manual control distance is shorter than the distance required for the vehicle 10 to make a lane change by automatic control. The manual control distance is an example of a second distance.

When the remaining distance is at least the manual control distance (step S304—Yes), it is decided to carry out a lane change for movement of the vehicle 10 to the target lane by manual control after the vehicle 10 has passed through the difficult traveling zone (step S305), and the series of processing steps is complete.

While the vehicle 10 is traveling within the difficult traveling zone, the control unit 235 may also notify the driver via the UI 6 of a request to move the vehicle 10 to the target lane by manual control after the vehicle 10 has passed through the difficult traveling zone. The driver then moves the vehicle 10 into the target lane by manual control after the vehicle 10 has passed through the difficult traveling zone.

When the remaining distance is less than the manual control distance (step S304—No), on the other hand, it is decided to begin a lane change for movement of the vehicle 10 to the target lane by manual control within the difficult traveling zone (step S306), and the series of processing steps is complete.

While the vehicle 10 is within the difficult traveling zone, the control unit 235 notifies the driver via the UI 6 of a request to begin movement of the vehicle 10 to the target lane by manual control. While the vehicle 10 is traveling within the difficult traveling zone, the driver begins to move the vehicle 10 into the target lane by manual control. The driver operates the vehicle 10 so as to move the vehicle 10 into the target lane before the vehicle 10 reaches the lane change completion location.

When the vehicle 10 is not located within the difficult traveling zone (step S301—No), when the current location of the vehicle is located in the target lane (step S302—Yes), or when the remaining distance is equal to or greater than the reference distance (step S303—No), the series of processing steps is complete.

With the vehicle control system of the embodiment described above, when a difficult traveling zone exists between the current location of the vehicle and the lane change completion location, it is decided whether to carry out lane change for movement of the vehicle to the target lane before or after the congested zone. The vehicle control system can thus carry out the predetermined lane change before the lane change completion location.

The vehicle control device and vehicle control system according to the aforementioned embodiment of the present disclosure may incorporate appropriate modifications that are still within the gist of the present disclosure. Moreover, the technical scope of the present disclosure is not limited to the embodiments described herein and includes the present disclosure and its equivalents as laid out in the Claims.

For example, in the embodiment described above a server decided on the difficult traveling zone while the traveling lane planning device carried out other vehicle control processing, but sharing of vehicle control processing by the server and traveling lane planning device are not limited to such a mode.

The vehicle control system may also have a first determining unit that determines whether or not a difficult traveling zone, where traveling of the vehicle is difficult, exists between the lane change completion location which is set on the target lane as one lane of a road having multiple lanes and where movement of the vehicle from the target lane to another lane is to be completed, and the current location of the vehicle, a calculating unit that, when it has been determined by the first determining unit that a difficult traveling zone exists, calculates a remaining distance between the end point of the difficult traveling zone in the traveling direction of the vehicle and the lane change completion location, a second determining unit that determines whether or not the remaining distance is at least a reference distance, and a deciding unit that decides to execute a lane change for movement of the vehicle to a target lane after the vehicle has passed through the difficult traveling zone, when it has been determined by the second determining unit that the remaining distance is at least the reference distance, or decides to execute a lane change for movement of the vehicle to a target lane before the vehicle reaches the difficult traveling zone, when it has been determined by the second determining unit that the remaining distance is less than the reference distance.

The server, while also deciding on the difficult traveling zone, may also have a first determining unit, calculating unit and second determining unit, and the traveling lane planning device may also have a deciding unit. Alternatively, the server, while also deciding on the difficult traveling zone, may have a first determining unit and calculating unit, and the traveling lane planning device may have a second determining unit and deciding unit. As another alternative, the server may have a first determining unit, calculating unit and second determining unit, and the traveling lane planning device may have a deciding unit, while also deciding on the difficult traveling zone.

For example, in some embodiments, the server and the traveling lane planning device carries out vehicle control processing in a collaborative manner so as to reduce communication between the traveling lane planning device and server.

The server may also decide on the difficult traveling zone based on terrain information such as merging points on the road, instead of receiving traffic information. When the server carries out first determination processing, the lane change completion location may be received from the traveling lane planning device, but the lane change completion location may also be set based on terrain information such as merging points on the road. The server may also carry out calculation processing and second determination processing using a self-set lane change completion location.

When the server carries out calculation processing, the traveling lane planning device may carry out second determination processing after receiving the remaining distance from the server.

Moreover, the lane change completion location of the embodiment described above was set as the location where the vehicle is to exit onto a branching road that branches from the road in which it is traveling, but the lane change completion location is not limited to this embodiment. For example, when the traveling lane in which the vehicle is traveling vanishes, the lane change completion location may be set as a location for movement into an adjacent lane which is adjacent to the traveling lane. When road on which the vehicle is traveling branches into two, the lane change completion location may be set on the traveling lane for movement into a lane of the branching road.

The invention claimed is:

1. A vehicle control device comprising:
a processor configured to:
    determine whether or not a difficult traveling zone where traveling of a vehicle is difficult exists between a lane change completion location which is set on a target lane as one lane of a road having multiple lanes and where movement of the vehicle from the target lane to another lane is to be completed and a current location of the vehicle,
    calculate a first distance between an end point of the difficult traveling zone in a traveling direction of the vehicle and the lane change completion location, when it has been determined that the difficult traveling zone exists,
    determine whether or not the first distance is at least a reference distance, and
    decide to execute a lane change for movement of the vehicle to the target lane after the vehicle has passed through the difficult traveling zone when it has been determined that the first distance is at least the reference distance or to decide to execute a lane change for movement of the vehicle to the target lane before the vehicle reaches the difficult traveling zone when it has been determined that the first distance is less than the reference distance.

2. The vehicle control device according to claim 1, wherein the processor is further configured to:
    determine whether or not the vehicle is located in the difficult traveling zone, when it has been decided to execute a lane change for movement of the vehicle into the target lane after the vehicle has passed through the difficult traveling zone,
    determine whether or not the current location of the vehicle is located in the target lane, when it has been determined that the vehicle is located within the difficult traveling zone,
    determine whether or not a newly calculated first distance is less than the reference distance, when it has been determined that the current location of the vehicle is not located in the target lane, and
    determine whether or not the first distance is equal to or greater than a second distance that allows a driver to move the vehicle into the target lane by manual control, when it has been determined that the first distance is less than the reference distance.

3. The vehicle control device according to claim 2, wherein the processor is further configured to notify the driver of a lane change request for movement of the vehicle to the target lane by manual control via a notification unit, when it has been determined that the first distance is equal to or greater than the second distance.

4. The vehicle control device according to claim 1, wherein
a reference distance is set for each lane of multiple lanes of the road on which the vehicle is traveling so that the reference distance is longer further from the target lane, and
the processor is further configured to:
    calculate the first distance between the end point of the difficult traveling zone on the traveling direction side of the vehicle and the lane change completion location for each of the multiple lanes,
    determine whether or not the first distance is at least the reference distance for each of the multiple lanes, and
    decide to execute a lane change for movement of the vehicle into the target lane after the vehicle has passed through the difficult traveling zone when it has been determined that the first distance is at least the reference distance for every one of the multiple lanes.

5. A vehicle control system comprising:
a vehicle having a first processor; and
a server having a second processor, wherein:
the first processor or second processor is configured to determine whether or not a difficult traveling zone where traveling of the vehicle is difficult exists between a lane change completion location which is set on a target lane as one lane of a road having multiple lanes and where movement of the vehicle from the target lane to another lane is to be completed and a current location of the vehicle,
the first processor or second processor is configured to calculate a first distance between an end point of the difficult traveling zone in a traveling direction of the vehicle and the lane change completion location, when it has been determined that a difficult traveling zone exists,
the first processor or second processor is configured to determine whether or not the first distance is at least a reference distance,
the first processor or second processor is configured to decide to execute a lane change for movement of the vehicle to the target lane after the vehicle has passed through the difficult traveling zone when it has been determined that the first distance is at least the reference distance, or to decide to execute a lane change for movement of the vehicle to the target lane before the vehicle reaches the difficult traveling zone when it has been determined that the first distance is less than the reference distance, and the first processor executes at least one of the processing operations while the second processor executes the remaining processing operations, or the second processor executes at least one of the processing operations while the first processor executes the remaining processing operations.

\* \* \* \* \*